Sept. 27, 1949.　　　　　J. M. LEAKE　　　　　2,483,212
MOWER GUARD

Filed Feb. 26, 1946　　　　　　　　　　　2 Sheets-Sheet 1

INVENTOR
James M. Leake

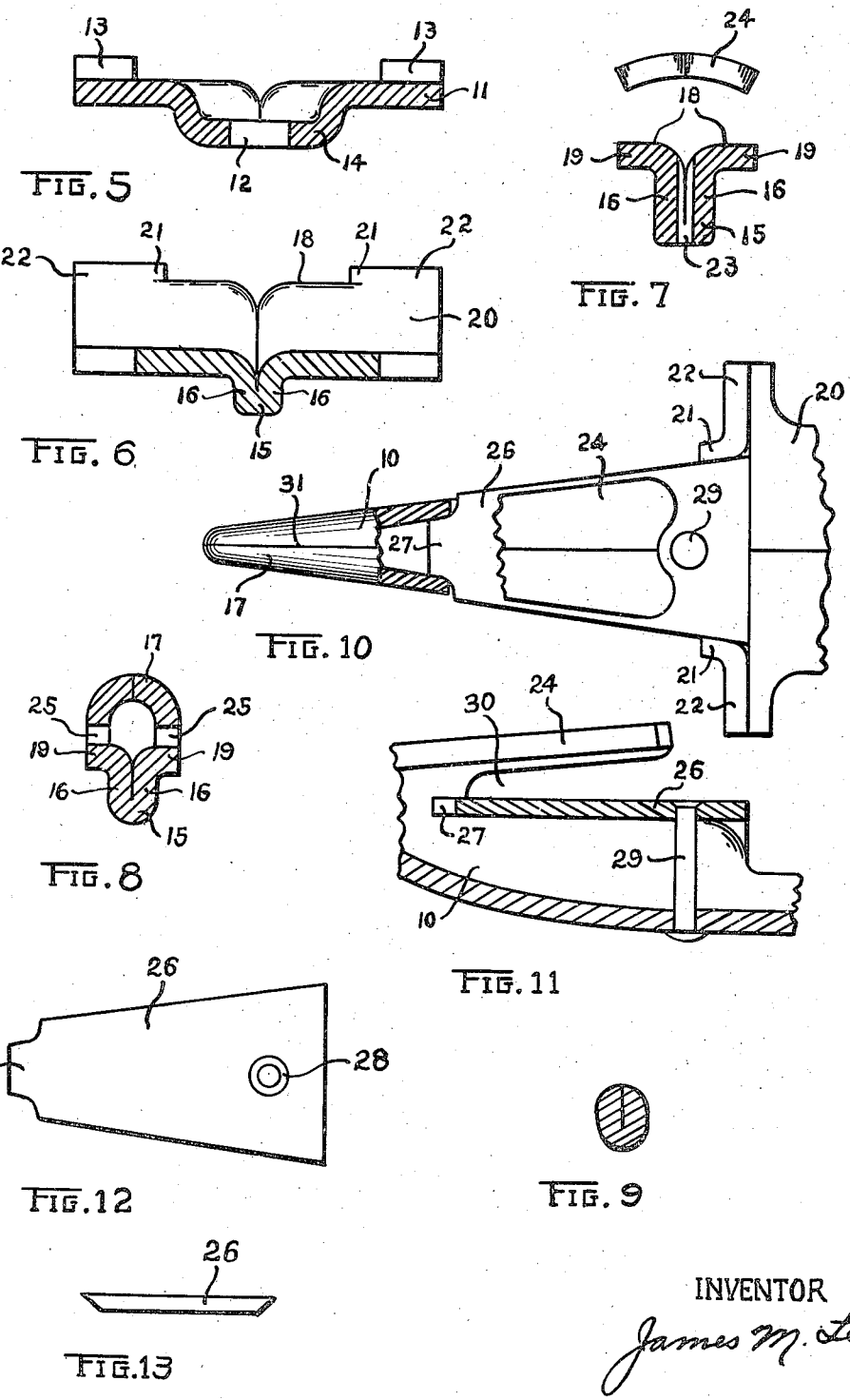

Patented Sept. 27, 1949

2,483,212

UNITED STATES PATENT OFFICE 2,483,212

MOWER GUARD

James M. Leake, Monroe, Mich.

Application February 26, 1946, Serial No. 650,231

1 Claim. (Cl. 56—310)

This invention relates to mower guards for reciprocating cutters of a mower, binder, harvester and other machines, and more particularly to mower guards made of sheet metal.

A great majority of the mower guards for the reciprocating knife of mowers and other machines are at the present time made from cast malleable iron with a steel ledger plate secured to the body of the mower guard to provide an efficient and durable cutting edge to cooperate with the reciprocating knife. These guards are made as light as is consistent with the strength requirements of a mower guard under normal operating conditions. Under exceptionally hard cutting conditions such as are encountered in stony fields, the cast malleable mower guards often prove to be very unsatisfactory. Under these operating conditions, the cast malleable mower guards bend or fracture. If the cast malleable mower guards do not fracture in the bending process, they do fracture if an attempt is made to straighten them. In an attempt to overcome these objections, however, mower guards have been made from cast steel and drop forged steel. In many cases a multiplicity of drop forgings or castings or a combination of forgings and castings have been welded together to form a complete mower guard. One objection to all such mower guards is that they are heavy and massive. The manufacturing process is complicated and the cost is much more than the cost of the ordinary cast malleable mower guard due to the nature of the process of manufacture.

Another objection to the cast or forged steel mower guard is that due to its strength and rigidity, the steel mower guard has very little resiliency. When a stone or other rigid object is caught or wedged between the reciprocating knife and the mower guard, the cast steel mower guard usually fractures or breaks.

Further attempts have been made to make mower guards from a plurality of stampings or from a combination of stampings and castings. These have proven unsatisfactory because the assembly process was expensive. Furthermore, they were made from a plurality of thin stampings, hence they did not have the required strength. They also had openings and hollow spaces which collected dirt and moisture which caused excessive corrosion. These stamped mower guards were provided with hollow forward sections substantially cone shaped. These hollow mower guards are of necessity made of light gage sheet metal and are very resilient. Hence, they do not fracture readily, but when they bend they cannot be straightened satisfactorily. Since it is impossible to back the inner surface of the hollow section while straightening this type of mower guard and as a result they kink or buckle in the straightening process.

My improved type of stamped mower guard successfully overcome these difficulties.

One of the objects of my invention is to provide a stamped mower guard constructed from a single piece of sheet steel.

Another object of my invention is to provide a stamped mower guard that is light in weight and at the same time possesses the necessary degree of strength required.

Another object of my invention is to provide a stamped sheet metal mower guard that possesses such a degree of elasticity as will enable it to yield under impact and then spring back to its original shape.

Another object of my invention is to provide a stamped metal mower guard that can be bent back to its original shape without fracturing, buckling or kinking in case it is bent by exceptionally severe working conditions.

Another object of my invention is to provide a mower guard that eliminates hollow sections which tend to collect dirt and moisture which in turn causes rapid corrosion.

Another object of my invention is to provide a mower guard that requires no assembly of a plurality of parts.

Another object of my invention is to provide a stamped mower guard that is adapted to quantity production.

Another object of my invention is to provide a mower guard that provides an adequate wearing shoe.

Another object of my invention is to provide a stamped mower guard that is strong, durable and inexpensive.

Other objects and advantages of my invention will be apparent during the course of the following description.

In the drawings:

Fig. 5 is a sectional view taken along line 5—5 of Fig. 2.

Fig. 6 is a sectional view taken along line 6—6 of Fig. 2.

Fig. 7 is a sectional view taken along line 7—7 of Fig. 2.

Fig. 8 is a sectional view taken along line 8—8 of Fig. 2.

Fig. 9 is a sectional view taken along line 9—9 of Fig. 2.

Fig. 10 is a fragmentary view, partially sectioned to show how the conventional ledger plate is secured in my improved stamped mower guard.

Fig. 11 is a fragmentary sectional view taken along line 11—11 of Fig. 10 showing a ledger plate in combination with my improved stamped mower guard.

Fig. 12 is a top plan view of the ledger plate used in combination with my improved mower guard.

Fig. 13 is an end view of the ledger plate shown in Fig. 12.

Figure 1:
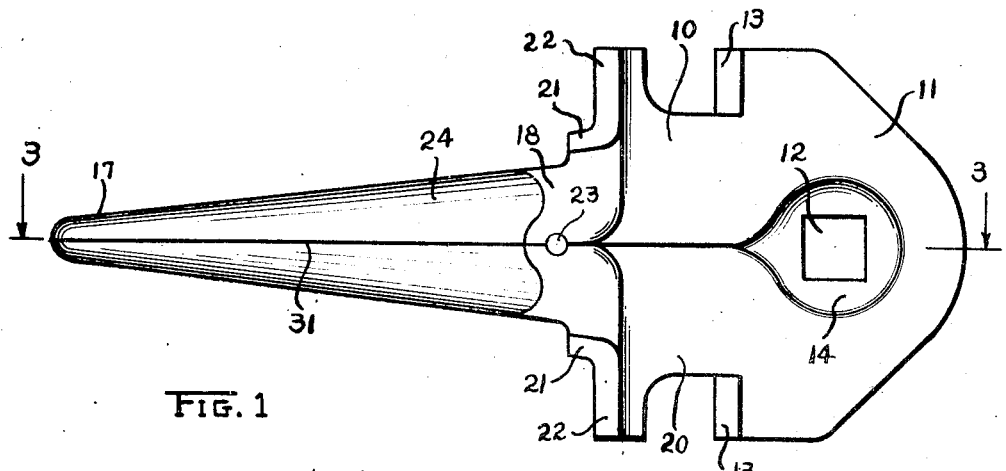
Fig. 1 is a top plan view of my improved mower guard.
Figure 2:
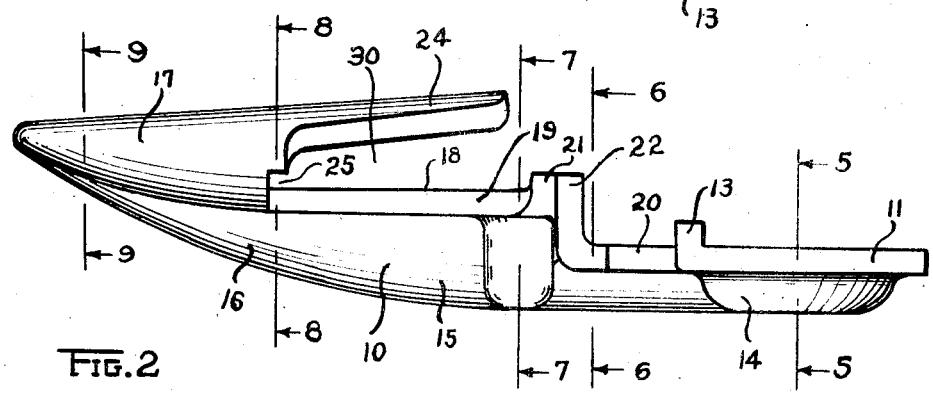
Fig. 2 is a front elevation of my improved mower guard shown in Fig. 1.
Figure 3:
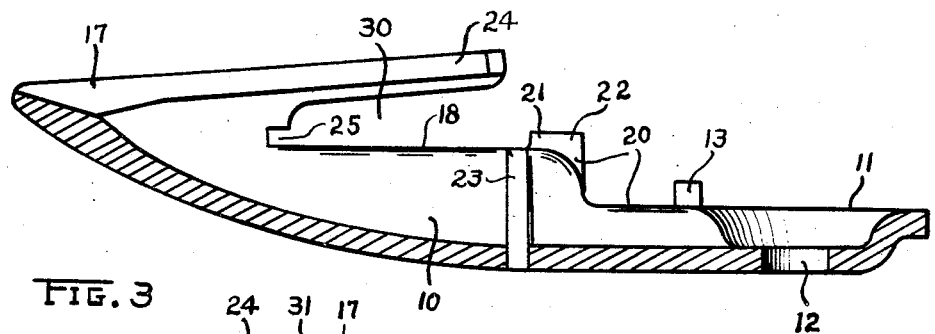
Fig. 3 is a sectional view taken along line 3—3 of Fig. 1.
Figure 4:
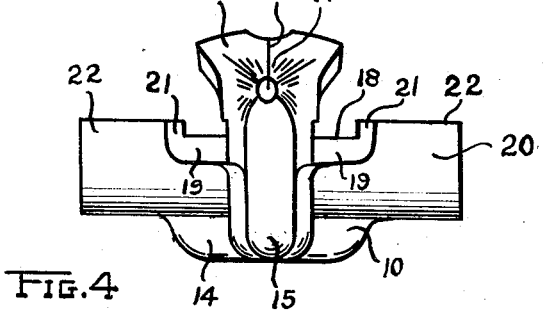
Fig. 4 is an end view of my improved mower guard.

In the drawing wherein for the purpose of illustration is shown a preferred embodiment of my invention. The numeral 10 designates a stamped sheet metal mower guard, the rear portion of which is provided with an attaching portion 11 by means of which the mower guard may be attached to a mower guard bar (not shown). It will be seen that the attaching portion is provided with an opening 12 for the reception of a fastening member which secures the attaching portion to the guard bar. The aperture 12 is located in a dished portion 14.

Cutter bar locating lugs 13 are integral with and bent upwardly from the attaching portion 11. A shoe portion 15 is provided by folding back upon itself the blank from which the stamped mower guard is formed to provide the layers 16—16. The shoe portion 15 extends from the dished portion forwardly to the nose or pointed end of the mower guard where the shoe 15 blends into the nose of the mower guard.

The nose 17 of the mower guard 10 is provided by forming the front end of the mower guard into a substantially cone shaped portion. A ledger plate bed 18 is provided by horizontal portions 19—19 extending at right angles from the shoe layers 16—16. The ledger plate bed 18 extends rearwardly from the nose portion 17 and is located at a higher level than the attaching portion 11. An intermediate web portion 20 extends forwardly and then upwardly to the ledger plate bed 18 and is integral with the attaching portion 11 and the ledger plate bed 18. Ledger plate locating bosses 21—21 are provided at the edges of the ledger plate bed 18 near the rear portion thereof. Knife bar guides 22—22 are integral with the ledger plate locating bosses 21—21 and extend sidewise therefrom. The knife bar guides 22—22 are integral with the intermediate web portion 20. A ledger plate securing aperture 23 is provided between the shoe layers 16—16.

A lip or knife guard portion 24 extends rearwardly from the nose portion 17 above the ledger plate bed 18. A knife slot 20 is provided between the lip 24 and the ledger plate bed 18. A ledger plate locating slot 25—25 is provided on each side of the stamped mower guard 10, between the lip 24 and the ledger plate bed 18 at the rear end of the nose 17.

Adapted to be disposed upon the upper surface of the ledger plate seat 18 is the ledger plate 26 which, at its forward end is formed with the forwardly projecting slightly angled lug 27 defined by laterally disposed shoulders. The rear end of the ledger plate is located by means of the ledger plate locating bosses 21—21. The ledger plate 26 is provided with a counter-sunk aperture 26 adapted to receive the head of a rivet 29 which passes through the aperture 23 and acts to hold the ledger plate in place. When the ledger plate 26 is in place, the lug 27 is disposed in the slots 25—25, thus locating and securing the forward end of the ledger plate.

In actual operation the knives (not shown) operate in the slot 30 between the lip 24 and the ledger plate 26. The edges of the ledger plate 26 are often provided with notches or serrations not shown because they are conventional in the present day ledger plate.

From the foregoing description it will be noted that my improved mower guard is composed of a single stamping. It is made from a single sheet metal blank of predetermined size and shape. In the stamping or pressing process, the fibers of the sheet metal blank are not destroyed, thus preserving the strength characteristics of the sheet metal.

The mower guard 10 is made from a single sheet metal blank hence no assembly is required to make my improved stamped mower guard.

My improved stamped mower guard has a seam 31 along the upper portion of the nose 17 and the lip 24. This seam may be welded but tests have shown that my improved stamped mower guard is strong enough without welding this seam.

My novel mower guard is lighter in weight than the conventional cast or forged mower guard. Since a sizeable number of mower guards are used on one cutter bar, a considerable decrease in the weight of one cutter bar assembly is provided by my improved stamped mower guard.

Laboratory tests have proven that my improved mower guard is stronger than the conventional cast or forged mower guard. Actual tests in the field also have proven my improved stamped mower guard stronger than the conventional cast mower guard which were assembled side by side on the same cutter bar. Furthermore, when my improved stamped mower guard was subjected to such strenuous conditions that they bent they could be repaired in the field by hammering them back in place while the cast mower guards fractured when they bent and broke completely while being straightened.

From the above description it will be apparent that my improved mower guard is strong, resilient and light in weight. My improved stamped mower guard is of one piece construction and therefore requires no assembly process. My improved mower guard is also interchangeable with the present cast mower guard.

While I have described one form of my invention, I do not wish to be limited to the particular form shown and described as it will be apparent to those skilled in the art that many modifications in a single piece stamped mower guard may be made without parting from the scope of my invention.

Having thus described my invention, what I claim is:

A mower guard body member formed from a single, metal blank, sheet of predetermined size and shape, said body member comprising upper and lower body portions; said upper body portion comprising an upper nose portion at the forward end thereof, and an upper lip portion extending rearwardly from said nose portion; said lower body portion comprising a lower nose portion at the forward end thereof, a substantially T shaped mid-section extending rearwardly from said lower nose portion, and a dished portion near the rear of said body member; said lower nose portion and the vertical portion of said T shaped mid-section being substantially solid by being formed from two vertical extending walls in vertical contacting relation, the horizontal portion of said T shaped mid-section forming a substantially solid base for supporting a ledger plate, a flat surface portion partially surrounding said dished portion, and the base of said dished portion provided with an opening through which a fastening member may extend to secure said mower guard to the guard bar of a mower.

JAMES M. LEAKE.

REFERENCES CITED

The following references are of record in the file of this patent:

UNITED STATES PATENTS

| Number | Name | Date |
|---|---|---|
| 2,431,509 | Ronfeldt | Nov. 25, 1947 |

FOREIGN PATENTS

| Number | Country | Date |
|---|---|---|
| 2,251 | Great Britain | Jan. 29, 1906 |
| 448,220 | Germany | Aug. 10, 1927 |